D. A. WHISENANT.
CULTIVATOR.
APPLICATION FILED AUG. 14, 1917.
1,262,418.
Patented Apr. 9, 1918.
2 SHEETS—SHEET 1.
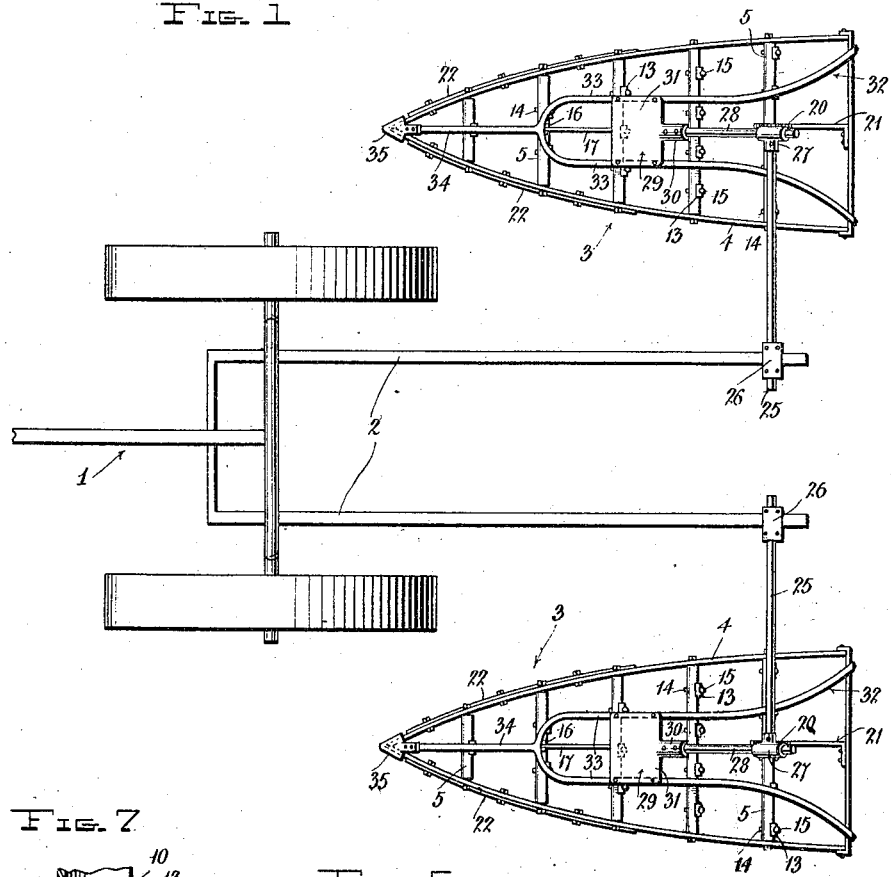
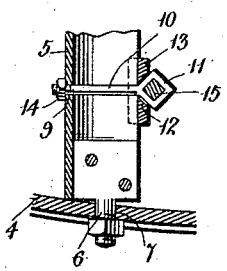
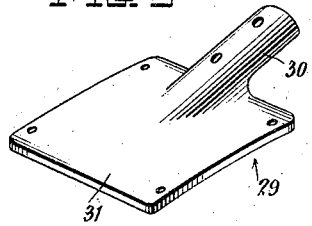
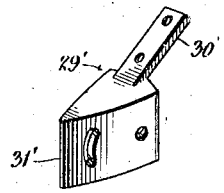
Witnesses
Inventor
David A. Whisenant,
By
Attorney

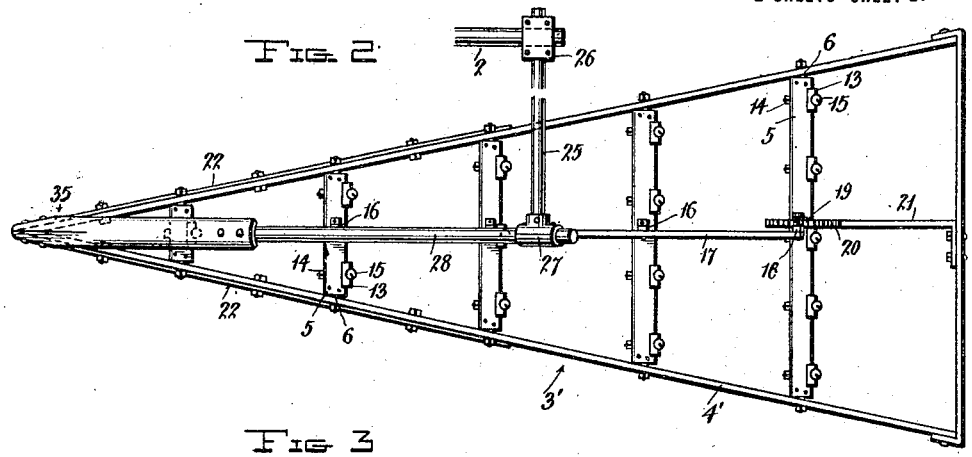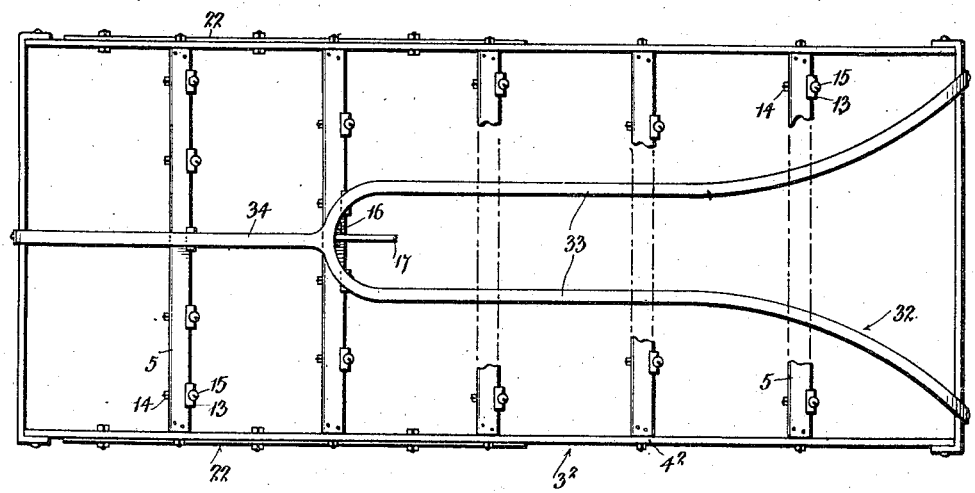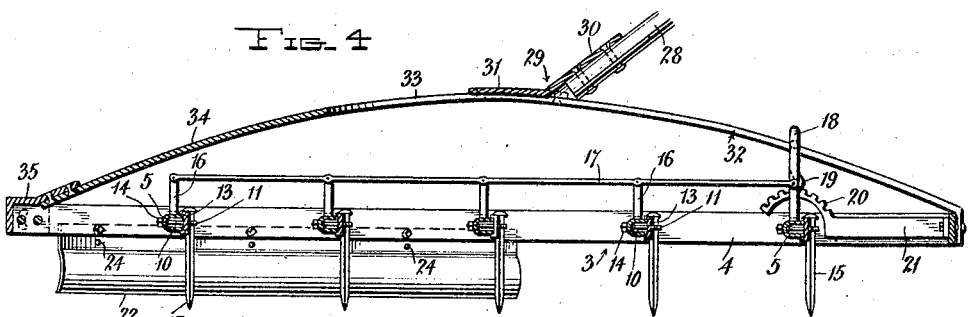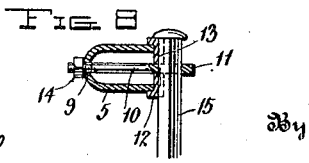

UNITED STATES PATENT OFFICE.

DAVID A. WHISENANT, OF GOLDSBORO, TEXAS.

CULTIVATOR.

1,262,418.  Specification of Letters Patent.  Patented Apr. 9, 1918.

Application filed August 14, 1917. Serial No. 186,139.

*To all whom it may concern:*

Be it known that I, DAVID A. WHISENANT, a citizen of the United States, residing at Goldsboro, in the county of Coleman and State of Texas, have invented new and useful Improvements in Cultivators, of which the following is a specification.

The present invention has reference to harrow attachments for cultivators; and it comprises, briefly, certain hereinafter described improvements relating primarily to the harrow and its arrangement or manner of mounting, whereby the harrow may be caused to follow a furrow so as to break and pulverize the crust which usually forms over cotton and other seed planted, thereby enabling the plants to come to a stand.

As is generally understood, it is customary to plant cotton in the furrow made by a lister or sweep, which piles the soil on each side of the furrow, the seed being thereafter covered with two or three inches of soil by small covering plows. This covering of soil usually becomes baked, by the combined action of rain and hot sunshine, into a hard crust which the plants cannot penetrate; nor can the ordinary drag harrow be utilized to break the crust because of its size, so that a small harrow, with short teeth must be employed. It has been proposed accordingly, to utilize in place of the ordinary harrow an implement termed a "scratcher," consisting of a sweep attached to a cultivator foot and studded with bolts for scratching and breaking up the crust; but such implements have generally proven unsatisfactory, both because they are inconvenient to operate and because the team and the cultivator wheels are on the rows. The present invention aims to rectify this defect by providing a small, light harrow of the character specified above, which may be readily attached to and detached from a cultivator foot, and may be effectively used not only to break up and pulverize the crust, but also to remove vegetation which is coming up through the soil ahead of the plants; the harrow being so connected to the cultivator as to pass over the row while the team walks between the rows.

An embodiment of the invention is illustrated in the accompanying drawing, wherein:

Figure 1 is a plan view, showing the improved harrow attachment in use on a cultivator.

Figs. 2 and 3 are plan views of harrows having frames of different shapes.

Fig. 4 is a longitudinal vertical section of the harrow shown in Fig. 1.

Figs. 5 and 6 are detail views of the shoes represented in Figs. 1 and 2.

Figs. 7 and 8 are enlarged longitudinal and transverse sections of one of the tooth bars, showing a tooth carried thereby, and the retainer and washer associated with the tooth.

Referring more particularly to said drawing, 1 designates, generally, a cultivator of more or less conventional form, the beams 2 of which are ordinarily equipped with feet for the attachment of the plows thereto. In the present construction, the feet and the plows are removed, and in place of them there is connected to each beam, in the manner hereinafter explained, one of the improved harrows 3, the arrangement being such that the team will walk between the rows of plants, while the harrows pass over the rows on each side of the team.

The harrows may be made with frames of different shapes, as will be understood. Thus, the harrow shown in Figs. 1 and 4 has a frame 4, which is substantially spatulate, *i. e.*, triangular, but with its sides curved instead of straight; the frame 4' of the harrow 3' represented in Fig. 2 has the form of a true triangle; and the frame 4² of the harrow 3² illustrated in Fig. 3 is rectangular, the first form being preferred. The tooth-carriers and other attachments are, however, the same in the main for all forms of harrow, and each comprises a horizontal metal bar 5 of U-section, provided at its ends with trunnions 6, which are journaled in openings 7 formed in the sides of the frame, a plurality of the bars being mounted in the frame in spaced, parallel relation and transversely of said frame.

In the back of each tooth bar, there is formed a longitudinal series of openings 9, and through each of these openings is passed, from front to back of the bar, the shank of a retainer 10, the latter having a skeleton, diamond-shaped head or eye 11 on its front end, and having its rear end threaded. The eye 11 of the retainer engages in a vertical seat 12 formed in the front face of a washer 13, which is disposed against the front of the bar and is provided with a central opening through which the retainer shank also passes, the result being that the retainer is centered by means of the washer and held in place by the latter and by its passage through the opening 9, the projecting end of the retainer being fitted with a nut 14, which is tightened against the bar so as to hold the harrow tooth 15 carried thereby in adjusted position. The harrow teeth 15 are inserted through the eyes 11 of the retainers, and are provided with enlarged heads which prevent them from falling through said eyes and being lost; they may be of any desired size and shape, but are preferably diamond-shaped in cross-section, so as to fit conformably in the openings in the eyes and thus be prevented from turning.

The tooth bars 5, of which any suitable number may be used, are joined together to rock in unison; and to this end, said bars, with the exception of the rearmost one, are each provided with an arm 16 which is rigidly fastened thereto, said arms being pivotally connected to a rod or link 17, whose rear end is fastened to a lever 18. The latter is bolted to the rearmost bar, and is equipped with a spring-controlled locking tooth 19 for co-action with a toothed segment 20, fixed to a longitudinally arranged beam 21. Consequently, forward or backward movement of the lever will rock all of the bars in the same direction, thereby raising or lowering the teeth carried by the bars; such adjustment being independent of, and supplemental to, that produced by raising or lowering the teeth through retainer eyes 11. In addition to the harrow teeth, either the triangular or the spatulate form of harrow may be equipped with a pair of blades 22, which are bolted to the sides of the frame and are utilized to destroy weeds, grass and other vegetation, as well as to clear away all trash or clods from the path of the harrow. These blades or knives are provided with upper and lower series of openings 24, which enable them both to be raised and lowered and to be moved endwise forward and backward, the holes for the fastening bolts alternating with those for the trunnions 6 of the tooth bars.

The attachment of the harrow to the cultivator beams is preferably effected by means of extension arms 25, which project outwardly in opposite directions from the beams 2 and are fastened to the rear ends of the latter by suitable clamps 26. The outer end of each of these arms 25 carries a T-coupling 27, whose long, vertical member or cross-piece adjustably fits over and is secured to the upper end of a bar 28, the lower end of the latter being connected to the harrow through the intermediary of a shoe. The shoes, like the harrow frames, may be made in various shapes, and are preferably fastened to spring supports, though they may, if desired, be affixed directly to the harrow frames, in which case the supports are, of course, omitted. Referring to Figs. 1 and 5, which illustrate the construction deemed most advantageous for all practical purposes, the shoe 29 therein shown comprises a semi-cylindrical upper portion 30 which is bolted to the end of the bar 28 and a base plate 31 which rests upon and is fastened to the spring support 32. The latter is substantially Y-shaped, and the base plate 31 bridges the space between the two arms 33 of the support, the rear portions of which curve outwardly and downwardly and are secured at their terminals to the rear corners of the harrow frame. The stem 34 of the support overlies the median line of the harrow, and is likewise curved downwardly, its free end being provided with a nose 35 which fits the apex of the harrow frame and is suitably fastened thereto. This form of support is used with both the spatulate and rectangular frames 4 and 4², and may, if desired, be also used with the triangular frame 4'. The shoe 29', represented in Fig. 6, has an upper portion 30' similar to the portion 30 of the shoe 29, but its base portion 31' is in the form of a triangular or V-shaped block, which fits in the apex of the triangular frame 4' and is adjustably secured thereto.

The operation of the implement is believed to be apparent from the foregoing, and, hence, to require no separate explanation. It may be stated, however, that more than one harrow can be attached to each beam of the cultivator, illustration thereof being considered unnecessary. In using the implement as a side harrow, the arrangement shown is reversed, the arm secured to the right-hand beam carrying the harrow under the left-hand beam, and vice versa. The teeth of the harrow are about half the length of ordinary harrow teeth, and are operated shallow, so as not to disturb the germinating seed which lie from one to two inches beneath the surface of the soil.

I claim as my invention:—

1. A row harrow comprising a skeleton frame; a set of transversely-arranged tooth bars mounted therein; a longitudinally-Y-shaped spring support mounted upon and secured to said frame; a shoe fastened upon said support and bridging the space between the arms thereof; and a bar on whose foot said shoe is mounted.

2. A row harrow comprising a substantially-triangular skeleton frame; a set of transversely-arranged tooth bars mounted therein; a pair of longitudinal blades arranged against the sides of the frame and extending in front of and below the same, said blades being provided with upper and lower series of openings; and fastening devices for attaching said blades to said frame sides engageable alternatively in said series of openings.

3. A harrow comprising a skeleton frame; tooth-carrying elements mounted therein; a longitudinally-arranged spring support mounted upon and secured to said frame; a shoe fastened upon said support; and a bar on whose foot said shoe is mounted.

4. A harrow comprising a skeleton frame; tooth-carrying elements mounted therein; a longitudinally-arranged spring support mounted upon and secured to said frame; a shoe fastened upon said support; a bar on whose foot said shoe is mounted; a pair of longitudinal blades arranged against the sides of said frame and extending in front of and below the same, said blades being provided with upper and lower series of openings; and fastening devices for attaching said blades to said frame sides engageable alternatively in said series of openings.

5. A harrow comprising a substantially-triangular frame; tooth-carrying elements mounted therein; a longitudinally-arranged, Y-shaped spring support mounted upon said frame, said support having its stem overlying the median line of the frame and fastened at its free end to the apex thereof, and having its arms curved outwardly and fastened at their free ends to the rear corners of said frame; a shoe fastened upon said support in position to bridge the space between said arms; and a bar on whose foot said shoe is mounted.

6. A harrow comprising a skeleton frame; tooth-carrying elements mounted therein; a longitudinally-arranged spring support mounted upon and secured to said frame; a shoe fastened upon said support; a bar on whose foot said shoe is mounted; and a pair of longitudinal blades arranged against the sides of said frame and extending in front of and below the same.

In testimony whereof I have hereunto set my hand in presence of two subscribing witnesses.

DAVID A. WHISENANT.

Witnesses:
 DAIN P. McCORCLE,
 MICHAL C. BRIGHT.

Copies of this patent may be obtained for five cents each, by addressing the "Commissioner of Patents, Washington, D. C."